United States Patent Office 3,618,416
Patented Nov. 9, 1971

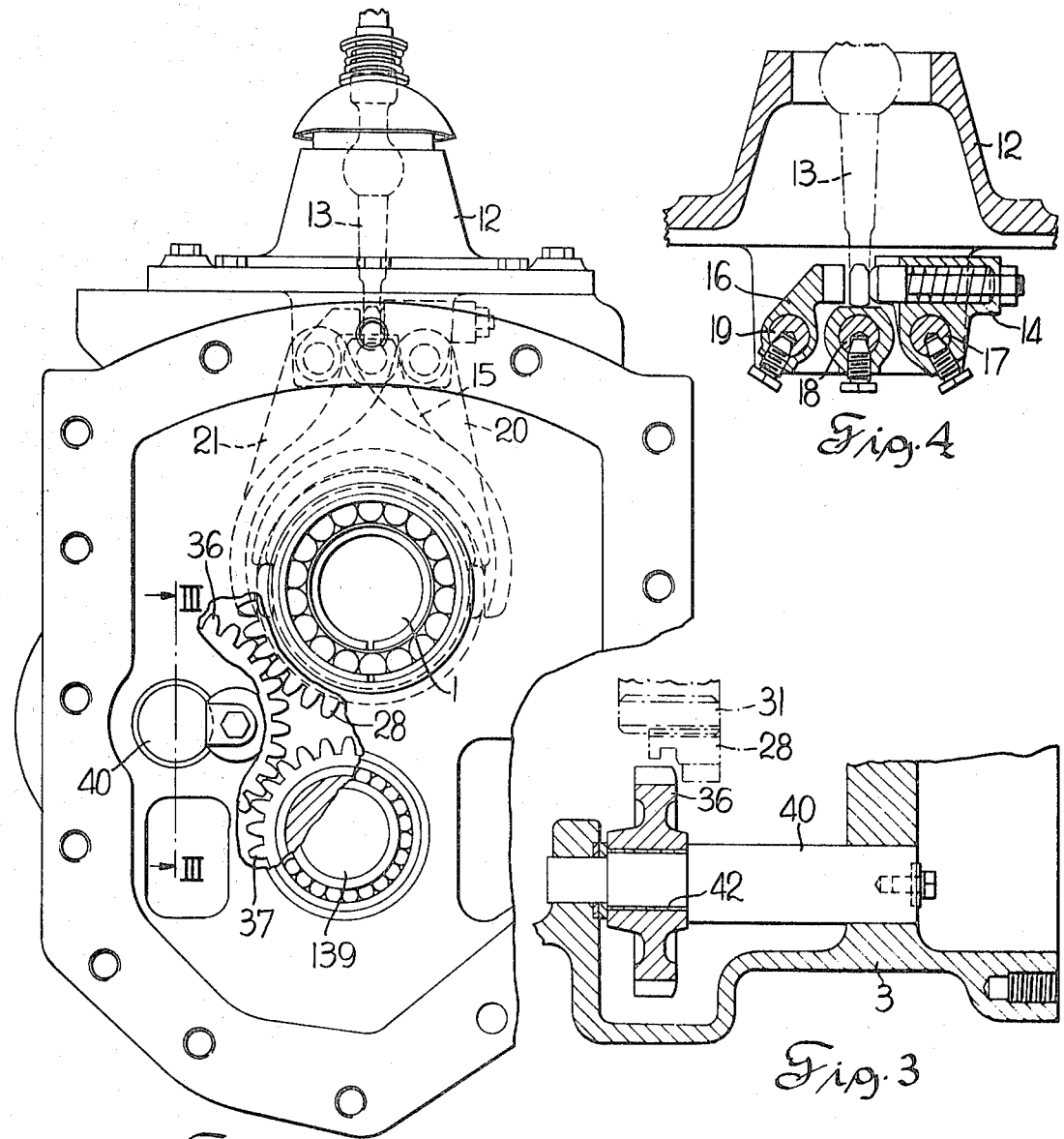
Fig. 2
Fig. 4
Fig. 3
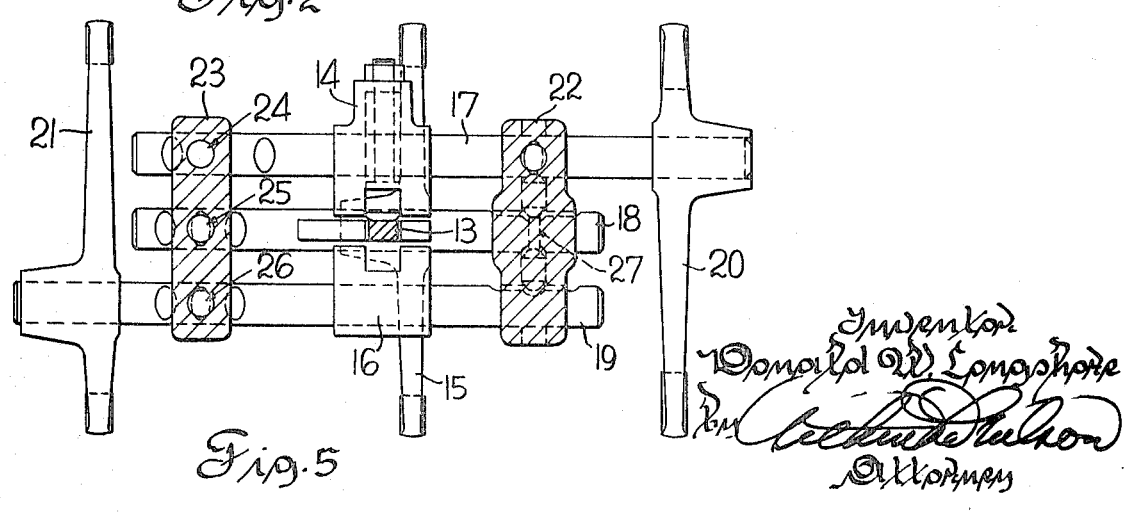
Fig. 5

3,618,416
MULTIPLE SPEED TRANSMISSION
Donald W. Longshore, New Berlin, Wis., assignor to Allis-Chalmers Manufacturing Company, Milwaukee, Wis.
Filed Jan. 2, 1970, Ser. No. 274
Int. Cl. F16h 3/08
U.S. Cl. 74—333                                10 Claims

ABSTRACT OF THE DISCLOSURE

A multiple speed transmission having a shift mechanism for operating a combination clutch sleeve and gear to selectively operate the transmission in forward and reverse.

This invention relates to a manually operated transmission and more particularly to a gear shift mechanism having a combinational clutch sleeve and sliding gear for selectively coupling a forward drive gear and a reverse drive gear by means of a shifter mechanism.

Conventional manually operated transmissions provide for a sliding clutch collar with synchronizing rings to selectively and alternatively engage one of the plurality of gears for transmitting power at selected gear ratios. One or more shift rails may be included in the transmission to provide the desired number of speed ratios for the transmission. The reverse gear drive includes a jackshaft to counterrotate the output shaft and is generally operated by a single operator engaging the reverse gear. Combining the function of the reverse shift mechanism with one of the forward speeds eliminates the need for additional shifter forks, rods, lugs, detents, interlocks and so on. Accordingly, this invention provides for a single shifter fork mechanism operating on a single shift rail to selectively operate a combination clutch sleeve and gear which slidably engages a selected forward gear operating through a countershaft for a forward drive and slidably engages a gear on a jackshaft which in turn drives through the countershaft to provide a reverse rotation of the output shaft. By the use of the combination clutch sleeve and gear the combination function is accomplished with a single shift rail which can be operated by a suitable manual shift lever.

Accordingly it is an object of this invention to provide a manually operated multiple speed transmission having a combination clutch sleeve and gear to slidably engage a gear for forward rotation of the output shaft and selectively engage a gear on a jackshaft to provide reverse rotation of the output shaft.

It is another object of this invention to provide a multiple speed transmission having a countershaft and a jackshaft with a combination clutch sleeve and gear whereby the clutch sleeve engages a gear for forward rotation and a jackshaft counterrotating gear for reverse rotation of the output shaft.

It is a further object of this invention to provide a manually operated multiple speed transmission having a countershaft and a jackshaft with a combination clutch sleeve and gear with selective means for engaging the clutch sleeve portion for forward rotation and the gear portion for counterrotation of the output drive shaft.

The objects of this invention are accomplished providing a multiple speed transmission adapted for manual operation for selectively engaging one of the plurality of forward gear ratios of a reverse gear. The transmission includes an input shaft, and an output shaft carrying clutching mechanisms and suitable levers for operating the clutching mechanisms. A countershaft carrying countershaft gears is selectively engaged for forward drive from the input shaft as well as a direct drive from the input shaft to the output shaft. A jackshaft in the transmission carries a gear engaging a gear on the countershaft for selectively engaging the combination clutch sleeve and gear for providing counterrotation of the output shaft. The first speed forward and reverse gear are selectively operated by a common shifter fork which is operated on a common shift rail for selectively engaging a forward speed gear or the reverse speed gear.

It is understood that the plurality of gears and clutching means as illustrated are carried on the output drive shaft. For the purpose of illustration this version of the invention will be described, however, it is understood that the input shaft might also carry the plurality of gears and the clutching means for selective engaging and disengaging of the gears. In the modification the output shaft would be driven directly by the countershaft and the countershaft gears would selectively engage with the input shaft gears.

A preferred embodiment of this invention is illustrated in the attached drawing and will be described in subsequent paragraphs.

FIG. 2 illustrates an end view of the transmission with a portion broken away to show the countershaft, the jackshaft and the output drive shaft.

FIG. 3 illustrates a fragmentary cross section view taken on line III—III of FIG. 2.

FIG. 4 is a fragmentary cross section view taken from line IV—IV of FIG. 1.

FIG. 5 is a view taken on line V—V of FIG. 1, showing only the shift rails and shifting forks of the transmission.

Figure 1:
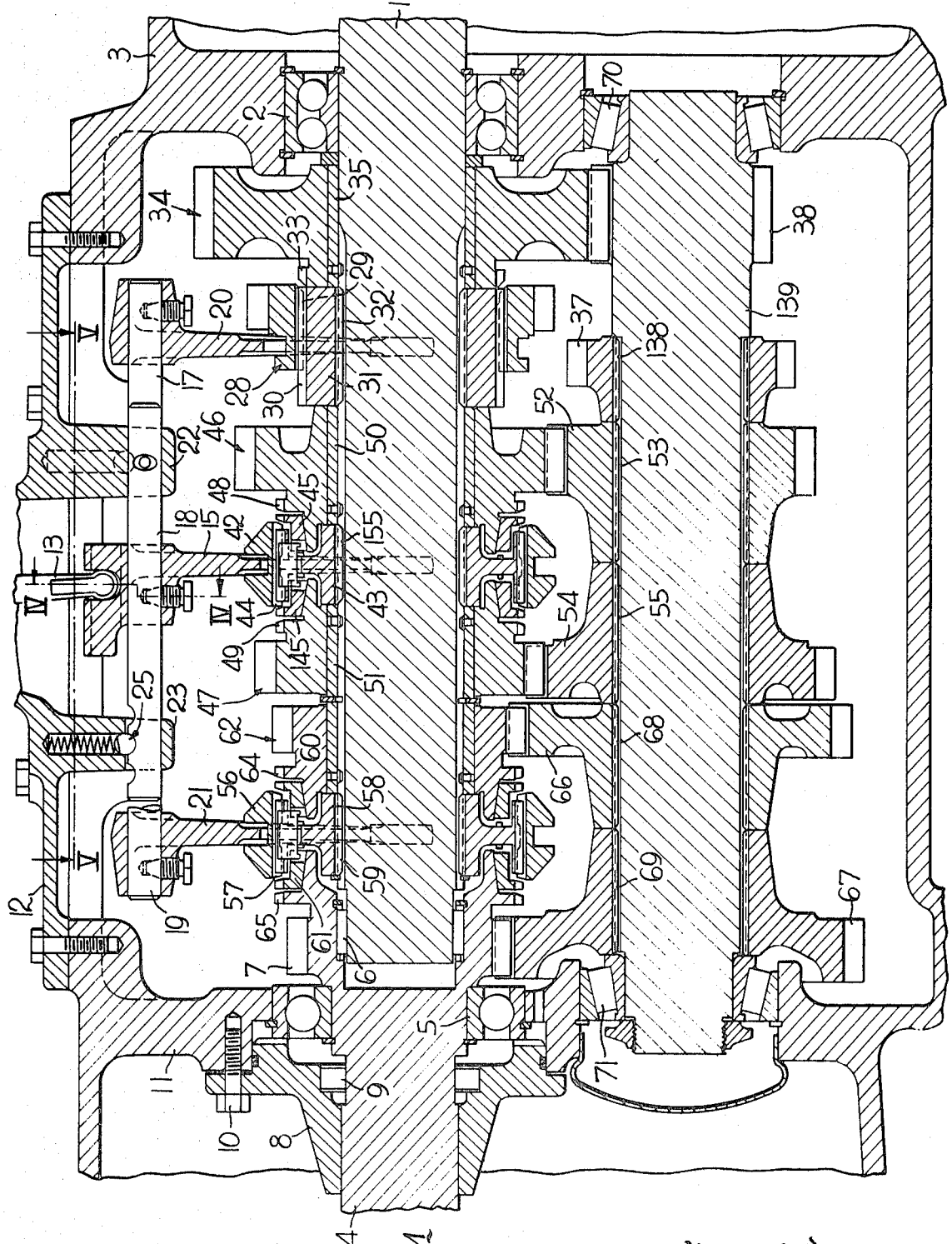
FIG. 1 illustrates a cross section view of the transmission taken through the center lines of the input and output shafts.

Referring to FIG. 1, output shaft 1 is rotatably supported in the bearing assembly 2 which is mounted in the transmission housing 3. The input drive shaft 4 is rotatably mounted in the bearing assembly 5 and also carries needle bearing assembly 6 in its open end formed by the gear 7. The needle bearing assembly 6 rotatably supports the inner end of output shaft 1. End plate 8 and seal 9 are fastened by a plurality of bolts 10 on the partition 11 of the transmission housing 3. A control cover 12 carries control lever 13 which selectively engages a lug 14, shifter fork 15 or lug 16. Suitable slots in the lugs 14 and 16 and the shifter fork 15 receive the end of the control lever 13 to accommodate shifting of the shift rails 17, 18 and 19. The shifter fork 20 is carried on shift rail 17 while the shifter fork 21 is carried on shift rail 19. The shift rails 17, 18 and 19 are slidably received within openings of the depending supports 22 and 23 of the control cover 12. Detent 24 engages grooves defining the neutral and shift positions for the shift rail 17. The detent mechanism 25 engages grooves which define the neutral and shift positions for the shift rail 18 while detent mechanism 26 engages grooves which define the neutral and shift positions for the shift rail 19. A suitable interlock mechanism 27 provides interlocking of two shift rails while the third shift rail is shifted out of the neutral position. A shift fork 20 is carried on shift rail 17 and engages the combination clutch sleeve and gear 28. The clutch combination sleeve and gear 28 are splined at 29 and received on a mating spline 30 of the clutch hub 31. The clutch hub 31 is splined at 32 to engage mating splines of the output shaft 1. The shifter work 20 shifts the combination clutch sleeve and gear 28 to the right to engage the clutch teeth 33 of gear 34 which is rotatably mounted on bushing 35. The bushing 35 is rotatably supported on the output shaft 1. The shifter fork 20 can also move in the left-hand direction to engage the combination clutch sleeve and gear 28 with jackshaft gear 36. The jackshaft gear 36 meshes with the countershaft gear 37 which is splined at 138 to the countershaft 139. Jackshaft 40 is supported in housing 3 and is embraced by bushing 42 rotatably supporting gear 36. Power is transmitted to output shaft 1 through the clutch hub 31, the combination clutch sleeve and gear 28. The jackshaft gear 36 is driven by the countershaft gear 37 and the countershaft gear 67 is driven by the input gear 7. The drive through the jackshaft gear 36 provides reverse rotation of the output shaft 1.

FIG 2 illustrates an end view of the jackshaft located relative to the countershaft 139 and the input shaft 1. FIG. 1 illustrates the combination clutch sleeve and gear 28 shifted to the neutral position with the combination clutch sleeve and gear 28 disengaged from the jackshaft gear 36 and disengaged from the clutch teeth 33 on the gear 34.

The shifter fork 15 engages the clutch collar 42 which is carried on a clutch hub 43. The clutch collar 42 and clutch hub 43 are connected by mating splines at 44.

The clutch hub 43 is connected by mating spline at 155 to the input shaft 1. Mounted concentrically with clutch hub 43, are synchronizing rings 45 and 145. The synchronizing ring 45 engages the gear 46 and the synchronizing ring 145 engages the gear 47. The clutch collar 42 selectively engages the teeth 48 and 49 of the gears 46 and 47 respectively. The gears 46 and 47 are rotatively mounted on bushings 50 and 51 carried on the output shaft 1. Gear 46 meshes with gear 52 which is splined at 53 with the countershaft 139. Gear 47 meshes with gear 54 which is splined at 55 with the countershaft 139. The output shaft 1 is selectively driven through the clutch collar 42 by the countershaft through gears 52 and 54 respectively.

The shifter fork 21 is carried on shift rail 19 and engages the clutch collar 56. Clutch collar 56 is splined at 57 where it engages mating splines on clutch hub 58. Clutch hub 58 is splined at 59 where it engages mating splines on input shaft 1. The clutch collar 56 rotates concentrically with the synchronizing rings 60 and 61. The synchronizer rings engaged the gears 62 and 7. The clutch collar 56 selectively engages the teeth 64 and 65 of the gears 62 and 7 respectively.

The gear 62 is in constant engagement with the countershaft gear 66. The gear 7 is in constant engagement with the countershaft gear 67. The countershaft gear 66 is connected by splines at 68 while the gear 67 is connected by splines at 69 to the countershaft 139. The countershaft 139 is rotatively supported by the bearing assembly 70 and 71 which is supported in the housing 3.

The preferred embodiment of this invention has been described and its operation will be subsequently described.

The driveshaft 1 drives through the transmission through one of a selected number of forward speeds and a reverse speed. The output shaft 1 is driven by the combination clutch sleeve and gear 28 or the collars 42 and 56. The control lever 13 selectively shifts one of the shift rails, shifter fork and collar to engage the desired speed ratio. The shifter fork 20 provides for the shifting to first gear or reverse while the shifter forks 15 and 21 provide for shifting the transmission into a higher gear ratio. When the shifter fork 20 is shifting in the left-hand direction the combination clutch sleeve and gear 28 engages the jackshaft gear 36 which in turn is in engagement with the countershaft gear 37. Countershaft gear 37 is splined to countershaft 139. The power is transmitted through gear 7, gear 67, gear 37, gear 36, combination clutch and sleeve 28 to the output shaft 1.

When the shifter fork 20 is moved in the right hand direction the splined inner portion of the combination clutch sleeve and gear 28 engages teeth 33 and connects output shaft 1 to the gear 34. The gear 34 is meshing with gear 38 on the countershaft 139 and the drive is carried through the countershaft from gear 67, to gear 38 to the output shaft 1.

When the control lever 13 engages the fork 15 and shifts the clutch collar 42 in the right hand direction the clutch teeth 48 of gear 46 are connected to the output drive shaft 1. The gear 46 is meshing with gear 52 and the power path flows through the countershaft 139 from gear 7 to the output shaft 1.

When the clutch collar 42 is shifted in the left-hand direction the clutch collar engages the clutch teeth 49 of gear 47 which is meshing with gear 54. The power is transmitted from input shaft 4 to output shaft 1 through the countershaft 139 and gear 54.

When the control lever 13 is engaged with lug 16 on shift rail 19, the shifter fork 21 carried on shift rail 19 moves the clutch collar 56 in the right-hand direction, the clutch teeth 64 of gear 62 are engaged and the power to the output shaft 1 is transmitted through the clutch collar 56 from the gear 62 which is in constant engagement with the gear 66. The power from gear 7 drives through gear 67 to the countershaft 139.

When the shifter fork 21 is moved in the left-hand direction the clutch collar engages the clutch teeth 65 of the gear 7. In this position the power in input shaft 4 drives directly through gear 7, the clutch collar 56, hub 58 to the output shaft 1.

The transmission as illustrated provides a single reverse and five speeds forward by selective operation of the control levers 13.

The embodiments of the invention in which an exclusive property or privilege is claimed are defined as follows:

1. A multiple speed transmission having mechanical clutching means comprising, a transmission housing, a first shaft connected to a gear rotatably mounted in said housing, a clutch carrying second shaft rotatably mounted in said housing for concentric rotation with said first shaft, a countershaft mounted in said housing for rotation about an axis parallel with the axis of said first shaft, a plurality of gears connected to said countershaft, the first of said gears meshing with said gear on said first shaft, a jackshaft mounted in said housing for rotation about an axis parallel with the axis of said first shaft and said countershaft, a jackshaft gear on said jackshaft meshing with a second of said gears of said countershaft, a plurality of gears rotatably mounted on said second shaft for engaging gears on said countershaft and clutching means for selectively connecting said gears to said second shaft, a hub on at least one of said plurality of gears on said second shaft defining external clutch teeth, a combination clutch sleeve and sliding gear slidably mounted on said second shaft defining an internal spline for selectively and alternatively engaging the clutch teeth of said one of said gears and connecting said one gear to said second shaft and defining external gear teeth for engagement with said jackshft gear, control means for selectively and alternatively shifting one of said clutching means and including a single shift rail and fork for shifting said combination clutch sleeve and sliding gear to selectively engage one of a plurality of forward speeds and reverse speed of said transmission.

2. A multiple speed transmission having a mechanical clutching means as set forth in claim 1, wherein said plurality of gears on said second shaft include 5 gears and said plurality of gears on said countershaft include 6 gears to thereby provide a reversed gear ratio and 5 forward gear ratios.

3. In a multiple speed transmission having mechanical clutching means as set forth in claim 1 wherein said combination clutch sleeve and sliding gear includes a clutch hub splined to said second shaft, said external gear portion engaging said jackshaft gear for providing reverse rotation of the output shaft when said jackshaft gear is engaging the combination clutch sleeve and sliding gear.

4. A multiple speed transmission having a mechanical clutching means as set forth in claim 1 wherein said first shaft comprises the output shaft to said transmission.

5. A multiple speed transmission having mechanical clutching means as set forth in claim 1 wherein said first shaft connected to said gear rotatably mounted in said housing comprises an integral shaft and gear.

6. A multiple speed transmission having mechanical clutching means as set forth in claim 1 wherein said gear connected to said first shaft includes clutching teeth, one of said plurality of clutching means rotatably mounted on said second shaft includes a clutch collar for coupling said gear on said first shaft to said second shaft to thereby provide direct power transmission from said first shaft to said second shaft in said transmission.

7. A multiple speed transmission having mechanical clutching means set forth in claim 1 wherein said control means comprise a single shift rail slidably mounted in said housing, a shifter fork on said shift rail engaging said combination clutch sleeve and sliding gear, lever means selectively and alternatively sliding said shift rail to selectively engage said combination sliding gear with said jackshaft gear and couple said combination clutch sleeve and sliding gear with one of said plurality of gears rotatably mounted on said second shaft.

8. A multiple speed transmission having a mechanical clutching means as set forth in claim 1 including control means comprising at least two shift rails, a shifting fork on each of said shifting rails for selectively and alternatively providing at least three forward speeds and one reverse for said transmission.

9. A multiple speed transmission having a mechanical clutching means as set forth in claim 1 wherein said transmission includes two shift rails slidably mounted in said housing, a shifter fork carried on each said shift rail, lever means for slidably moving each of said shift rails for selectively and alternatively coupling one of said plurality of gears to said second shaft and engaging said combination clutch sleeve and sliding gear with said jackshaft gear to thereby provide a single reverse and three forward speed ratios for said transmission.

10. A multiple speed transmission having mechanical clutching means as set forth in claim 1 including gear teeth, clutch teeth, and a peripheral groove defining the external periphery and a splined portion defining the internal portion of said combination clutch sleeve and sliding gear.

References Cited

UNITED STATES PATENTS

| | | | |
|---|---|---|---|
| 2,512,036 | 6/1950 | Orr | 74—333 |
| 2,753,728 | 7/1956 | Kelbel | 74—333 X |
| 3,088,336 | 5/1963 | Fodrea | 74—375 |
| 3,173,303 | 3/1965 | Galaniuk | 74—375 |
| 3,192,788 | 7/1965 | Fodrea | 74—375 |
| 3,308,673 | 3/1967 | Gardner | 74—333 |
| 3,403,568 | 10/1968 | Holcombe | 74—333 |
| 3,307,429 | 3/1967 | Lynes | 74—375 X |

ARTHUR T. McKEON, Primary Examiner

U.S. Cl. X.R.

74—363, 375